(12) United States Patent
Mayberry et al.

(10) Patent No.: US 7,374,027 B2
(45) Date of Patent: May 20, 2008

(54) BALANCED FLOW COOLING WATER JACKET

(75) Inventors: Richard Wayne Mayberry, Wichita Falls, TX (US); Ian Nigel Hakon, Bedford (GB)

(73) Assignee: Warner Electric Technology LLC, Quincy, MA (US)

( * ) Notice: Subject to any disclaimer, the term of this patent is extended or adjusted under 35 U.S.C. 154(b) by 27 days.

(21) Appl. No.: 11/263,394

(22) Filed: Oct. 31, 2005

(65) Prior Publication Data

US 2007/0095622 A1 May 3, 2007

(51) Int. Cl.
*B66D 5/02* (2006.01)
*F16D 65/833* (2006.01)
*F16D 65/853* (2006.01)

(52) U.S. Cl. .............................. 188/264 D; 188/264 CC

(58) Field of Classification Search ......... 188/218 XL, 188/264 D, 264 R, 264 E, 264 F, 264 LL, 188/264 W, 71.6
See application file for complete search history.

(56) References Cited

U.S. PATENT DOCUMENTS

| | | | |
|---|---|---|---|
| RE20,715 E | 5/1938 | Roberts | |
| 2,821,273 A | 1/1958 | Sanford et al. | |
| 2,942,699 A | 6/1960 | Eames | |
| 3,063,532 A * | 11/1962 | Jaeschke | 192/113.31 |
| 3,081,842 A | 3/1963 | Zindler et al. | |
| 3,124,216 A | 3/1964 | Buyze | |
| RE25,819 E | 7/1965 | Rockwell | |
| 3,410,375 A | 11/1968 | Schmidt | |
| 3,516,522 A | 6/1970 | Chamberlain | |
| 3,534,835 A | 10/1970 | Meier | |
| 3,566,997 A | 3/1971 | Heck | |
| 3,580,369 A | 5/1971 | Heck | |
| 3,862,678 A | 1/1975 | Collins | |
| 3,915,262 A | 10/1975 | Klaue | |
| 4,269,289 A | 5/1981 | Winkler | |
| 4,445,599 A * | 5/1984 | Bopp | 192/3.29 |
| 4,474,268 A | 10/1984 | Dayen | |
| 4,815,573 A | 3/1989 | Miyata | |
| 4,883,149 A | 11/1989 | Campbell et al. | |
| 6,029,782 A | 2/2000 | Chojecki et al. | |
| 6,478,126 B2 * | 11/2002 | Drecq | 188/264 D |
| 2005/0145447 A1 * | 7/2005 | Nowak et al. | 188/71.6 |

FOREIGN PATENT DOCUMENTS

GB 2307961 * 1/1997

* cited by examiner

*Primary Examiner*—Devon Kramer
(74) *Attorney, Agent, or Firm*—Dykema Gossett PLLC

(57) ABSTRACT

A fluid jacket for a disc brake is provided that promotes a balanced flow of cooling fluid throughout the fluid jacket to most effectively remove heat from the disc brake. The fluid jacket includes an annular body configured for engagement with a friction surface. The annular body defines a plurality of concentric flow passages. The annular body further defines first and second axial flow passages in fluid communication with first and second flow passages, respectively of the plurality of concentric flow passages, with the first and second flow passage separated by a third concentric flow passage. The annular body further defines a radial flow passage extending between the first and second axial flow passages, and a fluid inlet in fluid communication with the radial flow passage.

15 Claims, 2 Drawing Sheets

BALANCED FLOW COOLING WATER JACKET

BACKGROUND OF THE INVENTION

1. Field of the Invention

This invention relates to liquid cooled brakes and, more particularly, to a fluid jacket for use in liquid cooled brakes.

2. Disclosure of Related Art

A conventional disc brake employs two sets of friction plates that are interleaved with each other to transmit a braking force. The friction plates may be made from copper to enhance frictional heat transfer within the brake. Typically, one set of plates is fixed against rotation relative to a stationary body such as a brake housing, but is axially movable relative to the stationary body. The other set of plates rotate with a rotating body such as a driven shaft, but are also axially moveable relative to the rotating body. An actuator is employed to bring the plates into engagement through which the rotating body is braked.

Braking a rotating body results in a conversion of mechanical energy to heat energy. In many instances, it is desirable to provide for effective removal of some of the heat developed from the brake structure. One method of removing heat from a disc brake is to use a liquid to cool the brake structure and transfer heat out of the brake structure. In one conventional form of a liquid cooled disc brake, one set of the friction plates define fluid jackets for circulating a cooling fluid therethrough to reduce the heat generated in the brake by the frictional engagement of the friction plates.

One conventional fluid jacket has a plurality of concentric flow passages and a radial flow passage that is in fluid communication with each of the concentric flow passages. A fluid inlet and outlet communicate with the radial flow passage. In theory, fluid is simultaneously delivered to each of the concentric passages after entering the radial flow passage from the fluid inlet. In practice, however, it has been determined that the flow of fluid is uneven within and among the concentric passages. In particular, fluid flow in the radially inner concentric passages is relatively high, while fluid flow in the radially outer concentric passages is relatively low. Effective fluid flow in the radially outer concentric passages is especially important since more heat is generated toward the radially outer portion of the friction plate which rotates at a faster speed than the radially inner portion of the plate.

The inventors herein have recognized a need for a fluid jacket for a disc brake that will minimize and/or eliminate one or more of the above-identified deficiencies.

SUMMARY OF THE INVENTION

The present invention provides a fluid jacket for a disco brake that results in improved fluid flow.

A fluid jacket in accordance with the present invention includes an annular body configured for engagement with a friction surface. The annular body defines a plurality of concentric flow passages. The annular body further defines a first axial flow passage in fluid communication with a first flow passage of the plurality of concentric flow passages. The annular body further defines a second axial flow passage in fluid communication with a second flow passage of the plurality of concentric flow passages. The second flow passage is separated from the first flow passage by a third flow passage of the plurality of concentric flow passages. The annular body further defines a radial flow passage extending between the first and second axial flow passages and a fluid inlet in communication with the radial flow passage.

A fluid jacket in accordance with the present invention represents a significant improvement relative to conventional fluid jackets used in disc brakes. In particular, the inventive fluid jacket significantly improves fluid flow among the concentric flow passages of the fluid jacket promoting a more balanced fluid flow among the passages. As a result, the fluid jackets more effectively dissipate heat from the brake.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
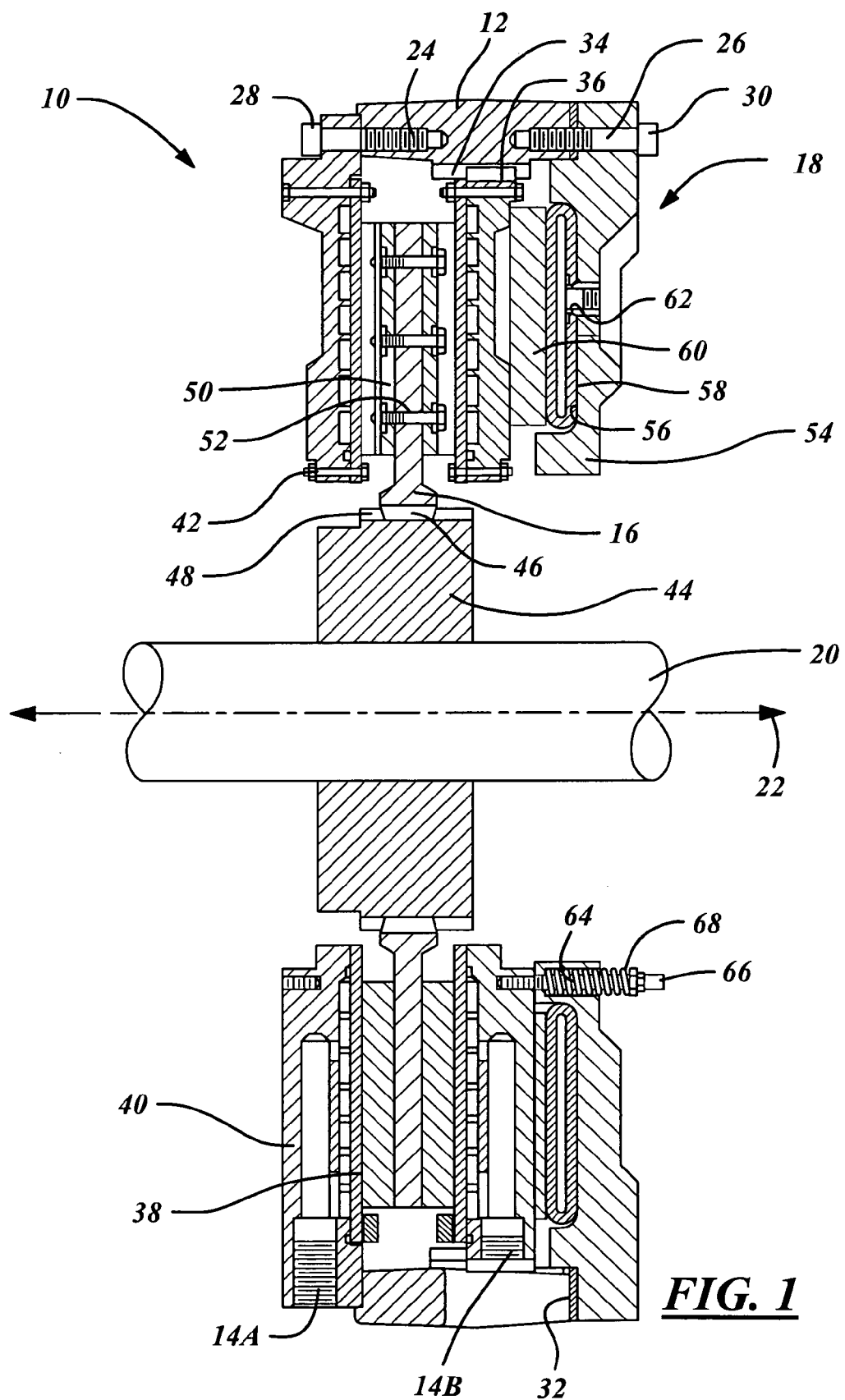
FIG. 1 is a cross-sectional view of a brake incorporating a fluid jacket in accordance with the present invention.

Referring now to the drawings wherein like reference numerals are used to identify identical components in the various views, FIG. 1 illustrates a brake 10 in accordance with the present invention. Brake 10 may be provided for heavy duty industrial use (e.g., on oil drilling equipment). Brake 10 includes a housing 12, two sets of friction plates 14A-B, 16, and an end cap assembly 18.

Housing 12 provides structural support to the other components of brake 10. Housing 12 may be made from conventional metals, metal alloys and/or plastics. Housing 12 is disposed about a driven shaft 20 and may be centered about the rotational axis 22 of the shaft 20. Housing 12 may be substantially circular in shape and unitary in construction. Housing 12 defines axially extending bores 24, 26 at either end configured to receive fasteners 28, 30 used to connect a friction plate 14 and end cap assembly 18, respectively, to housing 12. Housing 12 also defines a plurality of radial openings 32 sized for receipt of hoses and connectors (not shown).

Friction plates 14A, 14B are provided to transmit a braking torque to friction plate 16 and shaft 20 upon engagement of plates 14A, 14B, 16. Friction plate 14A is fixed to housing 12 by fasteners 28 extending through friction plate 14A. Friction plate 14B is coupled to housing 12 through the use of spline teeth 34, 36 on a radially inner surface of housing 12 and a radially outer surface of plate 14B, respectively. In this manner, plate 14B is fixed against rotation relative to housing 12, but is axially movable relative to housing 12. Although only one movable plate 14B is shown in the illustrated embodiment, it should be readily understood that additional plates 14B (and friction plates 16) could be interleaved and used to provide increased braking torque). Each of friction plates 14A, 14B includes one or more plates 38 and a fluid jacket 40 in accordance with the present invention (described in greater detail hereinbelow). Plates 38 are conventional in the art and may be made from a variety of conventional metals and metal alloys including iron or copper. Plates 38 may be connected to one or both sides of each fluid jacket 40 using fasteners 42 such as bolts or screws or pins.

Friction plate 16 is provided to transfer braking torque from friction plates 14A, B to shaft 20. Friction plate 16 may be made from conventional metals and metal alloys such as iron and copper. Plate 16 is coupled to a hub 44 fixed to shaft 20 (or directly to shaft 20) through the use of spline teeth 46, 48 on a radially inner surface of plate 16 and a radially outer surface of hub 44 (or shaft 20), respectively. Plate 16 may include a conventional friction material 50 connected to each side of plate 16 by fasteners 52 such as bolts or screws. Again, although only plate 16 is shown in the illustrated embodiment, it should be understood that additional plates 16 could be interleaved with additional plates 14B to increase braking torque.

End cap assembly 18 closes one end of housing 12 (opposite friction plate 14A) and provides support for brake actuators. In the illustrated embodiment, end cap assembly 18 includes a plate 54 that is annular in construction and which is fastened to housing 12 using one more fasteners 30. Plate 54 defines an annular recess 56 configured to receive an expandable bladder 58 that bears against a pressure plate 60. Plate 54 also defines an axial bore 62 through which pneumatic or hydraulic fluid is provided to bladder 58 via a hose (not shown) and a stepped diameter bore 64 through which a fastener 66 extends. Fastener 66 is surrounded by a spring 68 disposed in a larger diameter portion of bore 64 and extends through plate 54 into friction plate 14B. When fluid is supplied to bladder 58, bladder 58 expands and urges pressure plate 60 in an axial direction against the force of spring 68 to compress, and cause engagement of, friction plates 14A-B, 16. When fluid pressure is removed from bladder 58, spring 68 biases friction plate 14B in a second axial direction to its original position. Although the illustrated embodiment employs a single actuator acting as a tension brake, it should be understood that the fluid jackets 40 described herein could be employed in a variety of brakes.

Figure 3:
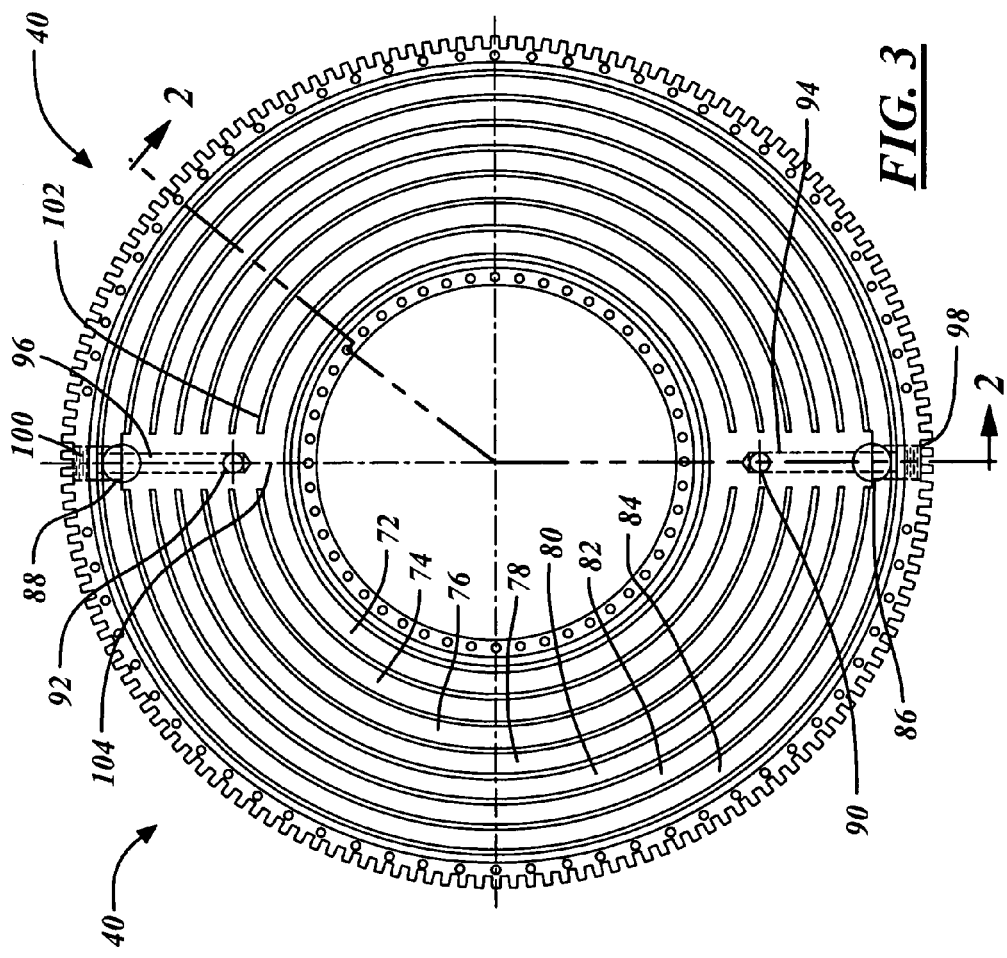
FIG. 3 is a plan view of a fluid jacket in accordance with the present invention.
Figure 2:
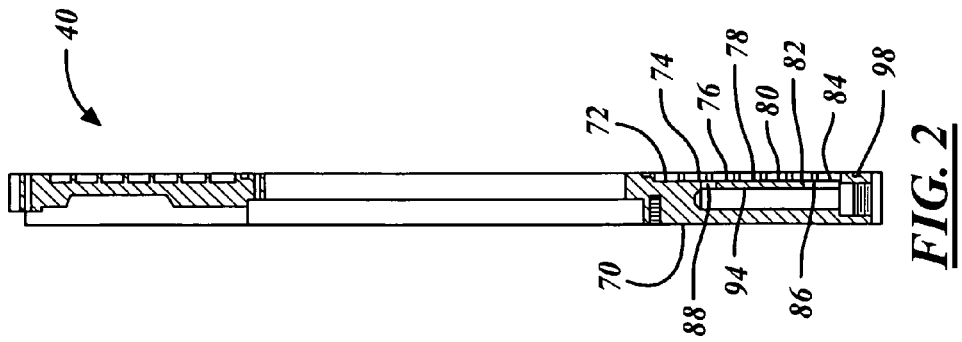
FIG. 2 is an enlarged cross-sectional view of a fluid jacket in accordance with the present invention.

Referring now to FIGS. 2-3, a fluid jacket 40 in accordance with the present invention will be described and illustrated. Jacket 40 is provided to allow for circulation of a cooling liquid such as water or another conventional liquid within brake 10 to allow for transfer of frictional heat generated within brake 10. Jacket 40 includes an annular body 70 that defines a fluid manifold through which liquid circulates and provides a surface on which plates 38 (See FIG. 1) are mounted. Body 70 may define a plurality of concentric flow passages 72, 74, 76, 78, 80, 82, 84 a plurality of axial flow passages 86, 88, 90, 92 a plurality of radial flow passage 94, 96 a fluid inlet 98 and a fluid outlet 100.

Concentric flow passages 72, 74, 76, 78, 80, 82, 84, are provided for circulation of a cooling liquid adjacent to plates 38 and along the entire radial and circumferential extent of plates 38. In the illustrated embodiment, flow passages 72, 74, 76, 78, 80, 82, 84 are disposed on only one axial face of body 70 of jacket 40. Referring to FIG. 1, however, it should be understood that similar passages may be formed on the opposite of body 70 of jacket 40 depending on the location of the friction plates 14A, 14B containing jacket 40 (e.g., if friction plates 16 were disposed on either side of friction plate 14B). It should also be understood that, although the illustrated embodiment of the invention shows seven (7) concentric flow passages 72, 74, 76, 78, 80, 82, 84, the number of flow passages could vary. In the illustrated embodiment, flow passage 72 comprises the radially innermost concentric flow passage while flow passage 84 comprises the radially outermost concentric flow passage. Flow passages 74, 76, 78, 80, 82 are disposed between flow passage 72, 84. Referring to FIG. 3, flow passages 72, 74, 76, 78, 80, 82, 84 are defined by concentric annular walls, such as wall 102, and may be in fluid communication with each other at partitions 104 that are made in walls 102 at diametrically opposite positions within fluid jacket 40. The radial width of the flow passages may be equal as shown in the illustrated embodiment.

Axial flow passages 86, 88, 90, 92 provide fluid communication between concentric flow passages 72, 74, 76, 78, 80, 82, 84 and radial flow passage 94, 96, respectively. Axial flow passages 86, 88, 90, 92, are each in direct fluid communication with at least one concentric flow passage 72, 74, 76, 78, 80, 82, 84. In the illustrated embodiment, axial flow passages, 86, 90, are in fluid communication with the radially outermost concentric flow passage 84 and are also in fluid communication with the flow passage 82 disposed radially inwardly of passage 84. A diameter of each of axial flow passages 86, 90 extends across the full radial length of concentric flow passage 84 and across only a portion (approximately one-half in the illustrated embodiment) of the radial length of concentric flow passage 82. Axial flow passages 88, 92, are in fluid communication with adjacent concentric flow passages 74, 76. A diameter of each of axial flow passages 88, 92 extends across only a portion (less than one-half in the illustrated embodiment) of the radial length of each of concentric flow passages 74, 76. The diameters of axial flow passages 88, 92, are smaller than the diameters of axial flow passage 86, 90. In the illustrated embodiment, no portion of radially innermost concentric flow passage 72 or flow passages 78, 80 are in direct fluid communication with any of axial flow passages 86, 88, 90, 92. Accordingly, the concentric flow passages 74, 76, and 82, 84, with which the axial flow passages, 88, 92, and 86, 90, respectively, are in direct fluid communication are separated by concentric flow passages 78, 80.

Radial flow passages 94, 96 provides fluid communication between axial flow passages 86, 88, 90, 92, and fluid inlet 98 and outlet 100. Radial flow passages 94, 96 extend between axial flow passages 86, 90 and 88, 92, respectively. The diameters of radial flow passages 94, 96, may be constant between axial flow passages 86, 90 and 88, 92, respectively,. Radial flow passage 94, 96 may be located at diametrically opposite locations within jacket 40 and may be axially aligned with partitions 104 in annular walls 102 forming concentric flow passages 72, 74, 76, 78, 80, 82, 84.

Fluid inlet 98 and fluid outlet 100 are provided for the introduction and exit of fluid from fluid jacket 40. Inlet 98 and outlet 100 may be located at radially outer points on jacket 40. Inlet 98 and outlet 100 may have a diameter greater than the diameter of radial flow passages 94, 96 and may be sized, and threaded, to receive a fluid connector (not shown).

A fluid jacket in accordance with the present invention represents a significant improvement relative to conventional fluid jackets. In particular, the inventive fluid jacket significantly improves and optimizes fluid flow among the concentric flow passages of the fluid jacket promoting a more balanced fluid flow among the passages. As a result, the fluid jackets more effectively dissipate heat from the brake.

While the invention has been shown and described with reference to one or more particular embodiments thereof, it will be understood by those of skill in the art that various changes and modifications can be made without departing from the spirit and scope of the invention.

We claim:

1. A fluid jacket for a disc brake, comprising:
an annular body disposed about an axis defining:

a plurality of concentric flow passages;
a first axial flow passage in fluid communication with a first flow passage of said plurality of concentric flow passages;
a second axial flow passage in fluid communication with a second flow passage of said plurality of concentric flow passages, said second flow passage separated from said first flow passage by a third flow passage of said plurality of concentric flow passages;
a radial flow passage extending between said first and second axial flow passages; and,
a fluid inlet in communication with said radial flow passage
wherein direct fluid flow from said radial flow passage to said third flow passage along said axis is prohibited.

2. The fluid jacket of claim 1 wherein said first flow passage of said plurality of concentric flow passages comprises a radially outermost flow passage of said plurality of concentric flow passages.

3. The fluid jacket of claim 1 wherein a diameter of said first axial flow passage extends across a radial length of said first flow passage of said plurality of concentric flow passages.

4. The fluid jacket of claim 1 wherein said first axial flow passage is in fluid communication with a fourth flow passage of said plurality of concentric flow passages, said fourth flow passage disposed radially outwardly of said third flow passage.

5. The fluid jacket of claim 4 wherein a diameter of said first axial flow passage extends across only a portion of a radial length of said fourth flow passage of said plurality of concentric flow passages.

6. The fluid jacket of claim 1 wherein a diameter of said second axial flow passage extends across only a portion of a radial length of said second flow passage of said plurality of concentric flow passages.

7. The fluid jacket of claim 1 wherein said second axial flow passage is in fluid communication with a fourth flow passage of said plurality of concentric flow passages, said fourth flow passage disposed radially inwardly of said third flow passage.

8. The fluid jacket of claim 7 wherein a diameter of said second axial flow passage extends across only a portion of a radial length of said fourth flow passage of said plurality of concentric flow passages.

9. The fluid jacket of claim 1, wherein said second flow passage of said plurality of concentric flow passages is disposed radially inwardly from said first flow passage of said plurality of concentric flow passages and a fourth flow passage of said plurality of concentric flow passages is disposed radially inwardly of from said second flow passage of said plurality of concentric flow passages.

10. The fluid jacket of claim 1 wherein said second axial flow passage is smaller in diameter than said first axial flow passage.

11. The fluid jacket of claim 1 wherein a fourth flow passage of said plurality of concentric flow passage separates said first and second flow passages of said plurality of concentric flow passages.

12. The fluid jacket of claim 1 wherein a diameter of said radial flow passage is constant between said first and second axial flow passages.

13. A brake, comprising:
a stationary housing disposed about a driven shaft, said driven shaft rotating about a rotational axis;
a first friction plate coupled to said housing and fixed against rotation relative to said housing;
a second friction plate coupled to said driven shaft for rotation therewith and for axial movement relative to said driven shaft;
a pressure plate configured for selective movement in a first axial direction towards said first and second friction plates;
wherein said first friction plate defines a fluid jacket including
an annular body disposed about an axis defining
a plurality of concentric flow passages;
a first axial flow passage in fluid communication with a first flow passage of said plurality of concentric flow passages;
a second axial flow passage in fluid communication with a second flow passage of said plurality of concentric flow passages, said second flow passage separated from said first flow passage by a third flow passage of said plurality of concentric flow passages;
a radial flow passage extending between said first and second axial flow passages; and,
a fluid inlet in communication with said radial flow passage
wherein direct fluid flow from said radial flow passage to said third flow passage along said axis is prohibited.

14. The brake of claim 13 wherein one of said first and second axial flow passages is in communication with a fourth flow passage of said plurality of concentric flow passages.

15. The brake of claim 13 wherein said second axial flow passage is smaller in diameter than said first axial flow passage.

* * * * *